US012698592B2

(12) United States Patent
Isozaki et al.

(10) Patent No.: US 12,698,592 B2
(45) Date of Patent: *Aug. 4, 2026

(54) SHEET MANUFACTURING APPARATUS

(71) Applicant: SEIKO EPSON CORPORATION, Tokyo (JP)

(72) Inventors: Goshiro Isozaki, Nagano (JP); Toshizo Nishi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 168 days.

This patent is subject to a terminal disclaimer.

(21) Appl. No.: 18/749,781

(22) Filed: Jun. 21, 2024

(65) Prior Publication Data

US 2024/0426054 A1 Dec. 26, 2024

(30) Foreign Application Priority Data

Jun. 23, 2023 (JP) ................................ 2023-103173

(51) Int. Cl.

*D21F 1/02* (2006.01)
*B27N 3/04* (2006.01)
*D21F 2/00* (2006.01)

(52) U.S. Cl.

CPC ............... *D21F 1/026* (2013.01); *B27N 3/04* (2013.01); *D21F 1/022* (2013.01); *D21F 2/00* (2013.01)

(58) Field of Classification Search

CPC . D21F 1/026; D21F 1/022; D21F 2/00; D21F 9/00; D21F 9/02; D21F 7/00; D21F 7/008; D21H 11/01; B27N 3/00; B27N 3/02; B27N 3/08; B27N 1/00; B27N 1/02; B27N 3/007; B27N 3/04; D21B 1/08; D21B 1/10

See application file for complete search history.

(56) References Cited

U.S. PATENT DOCUMENTS

| | | | | |
|---|---|---|---|---|
| 9,315,941 | B2 | 4/2016 | Gomi et al. | |
| 11,111,613 | B2 * | 9/2021 | Higuchi | B27N 3/18 |
| 11,174,594 | B2 * | 11/2021 | Gomi | D21B 1/08 |
| 11,802,377 | B2 * | 10/2023 | Nakazawa | D21H 11/12 |
| 2019/0136451 | A1 | 5/2019 | Higuchi et al. | |

(Continued)

FOREIGN PATENT DOCUMENTS

| | | | | |
|---|---|---|---|---|
| CN | 119177581 A | * 12/2024 | | B27N 1/00 |
| CN | 119177582 A | * 12/2024 | | D21F 7/008 |

(Continued)

*Primary Examiner* — Jose A Fortuna

(74) *Attorney, Agent, or Firm* — Spencer Fane LLP

(57) ABSTRACT

An apparatus includes: a defibrating unit that defibrates a material to turn it into fibers; a fiber piling-up unit that piles up the fibers to form a second web; a pressing portion that presses the second web to turn it into a sheet; and a humidifying mechanism that supplies humidified air to the fiber piling-up unit. The fiber piling-up unit includes a rotating portion that stirs the fibers supplied from the defibrating unit, a case in which the rotating portion is housed, and a mesh belt that is provided under the case and transports the second web in a transportation direction. The second web is formed on the mesh belt by piling up the fibers on the mesh belt. The humidifying mechanism includes an upstream-side nozzle that is provided upstream of the fiber piling-up unit in the transportation direction and supplies the humidified air to the fiber piling-up unit.

3 Claims, 7 Drawing Sheets

(56) References Cited

U.S. PATENT DOCUMENTS

| | | | | |
|---|---|---|---|---|
| 2020/0011010 | A1 | 1/2020 | Kobayashi | |
| 2020/0011013 | A1 | 1/2020 | Kobayashi | |
| 2020/0173105 | A1 * | 6/2020 | Higuchi | D04H 1/736 |
| 2021/0292971 | A1 * | 9/2021 | Gomi | D21F 9/00 |
| 2022/0056642 | A1 * | 2/2022 | Nakazawa | D21H 11/14 |
| 2024/0426053 | A1 * | 12/2024 | Isozaki | D21F 1/34 |
| 2024/0426054 | A1 * | 12/2024 | Isozaki | D21F 9/00 |

FOREIGN PATENT DOCUMENTS

| | | | | | |
|---|---|---|---|---|---|
| EP | 3508636 | A1 | * | 7/2019 | D21F 9/00 |
| JP | 2020084394 | A | * | 6/2020 | D21F 9/00 |
| JP | 2024143667 | A | * | 10/2024 | D21B 1/10 |
| WO | 2012/095928 | A1 | | 7/2012 | |
| WO | 2013/176222 | A1 | | 11/2013 | |

* cited by examiner

SHEET MANUFACTURING APPARATUS

The present application is based on, and claims priority from JP Application Serial Number 2023-103173, filed Jun. 23, 2023, the disclosure of which is hereby incorporated by reference herein in its entirety.

BACKGROUND

1. Technical Field

The present disclosure relates to a sheet manufacturing apparatus.

2. Related Art

JP-A-2020-084394 discloses a structure of a sheet manufacturing apparatus that forms a web by piling up a defibrated material in a former (fiber piling-up unit) disposed inside a housing. The entire space inside the housing is humidified so as to suppress the drying and electrification of fibers in the former.

However, in the structure disclosed in JP-A-2020-084394, a large amount of water is required for humidifying the entire space inside the housing, resulting in low humidification efficiency.

SUMMARY

A sheet manufacturing apparatus according to a certain aspect of the present disclosure includes: a defibrating unit that defibrates a material to turn the material into fibers; a fiber piling-up unit that piles up the fibers to form a web; a pressing unit that presses the web to turn the web into a sheet; and a humidifying mechanism that supplies humidified air to the fiber piling-up unit, wherein the fiber piling-up unit includes a rotating portion that stirs the fibers supplied from the defibrating unit, a case in which the rotating portion is housed, and a transportation belt that is provided under the case and transports the web in a transportation direction, the web is formed on the transportation belt by piling up the fibers on the transportation belt, and the humidifying mechanism includes a nozzle that is provided upstream of the fiber piling-up unit in the transportation direction and supplies the humidified air to the fiber piling-up unit.

DESCRIPTION OF EMBODIMENTS

First, with reference to FIG. 1, a structure of a sheet manufacturing apparatus 100 will now be described.

In each of the accompanying drawings, three axes orthogonal to one another are illustrated as X, Y, and Z axes. The direction along the X axis is defined as "X direction". The direction along the Y axis is defined as "Y direction". The direction along the Z axis is defined as "Z direction". The direction indicated by an arrow is defined as "positive direction" (+). The direction opposite of the positive direction is defined as "negative direction" (−). The +Z direction will be sometimes referred to as "above", "over", or "front side", and the −Z direction will be sometimes referred to as "below", "under", or "back side". A view taken in the +Z direction and a view taken in the −z direction will be sometimes referred to as "plan view" or "in plan". The term "upper surface" or "front surface" will be used for referring to a +Z-direction-side surface, and the term "lower surface" or "back surface" will be used for referring to a −Z-direction-side surface, which is the opposite thereof. In FIG. 1, the left side (−X direction) will be referred to as "upstream side", and the right side (+X direction) will be referred to as "downstream side".

Figure 1:
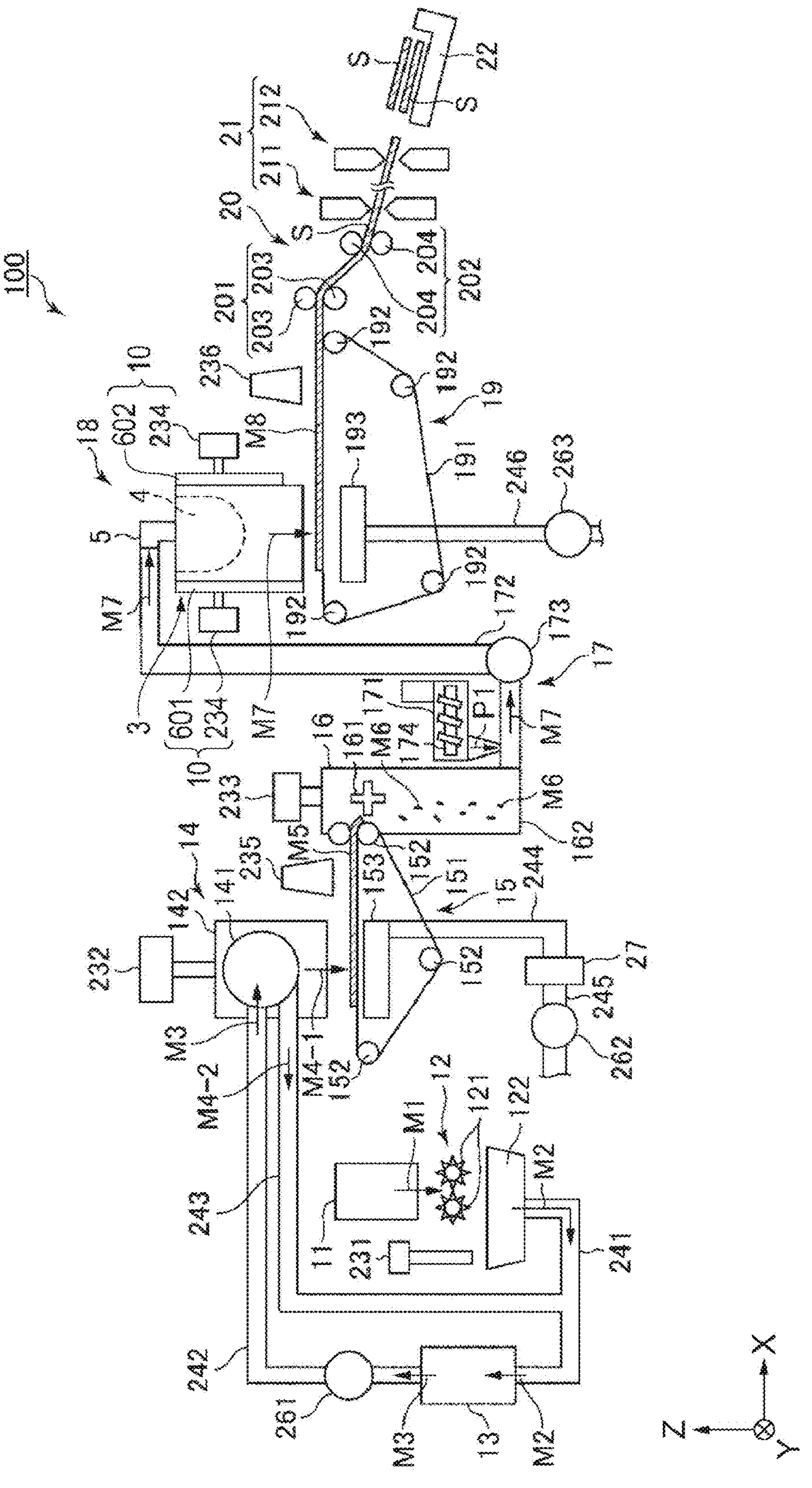
FIG. 1 is a schematic view illustrating a structure of a sheet manufacturing apparatus.

As illustrated in FIG. 1, the sheet manufacturing apparatus 100 is an apparatus suited for manufacturing new paper by defibrating a raw material, specifically, for example, used waste paper such as confidential paper, by dry defibration to fiberize the raw material, and by pressing and heating the fiberized material after the dry defibration and then cutting the pressed-and-heated material. To enhance the binding strength or the degree of whiteness of paper products or to add functionality such as color, flavor, or flame resistance, etc. thereto, various additives may be mixed into the fiberized material, depending on uses/applications. Moreover, it is possible to manufacture paper of various types of thickness and size, for example, A4-sized or A3-sized office-use paper, business-card paper, etc., by performing molding while controlling paper density, paper thickness, and paper shape, depending on uses/applications.

As illustrated in FIG. 1, the sheet manufacturing apparatus 100 includes a raw material supplying unit 11, a coarse crushing unit 12, a defibrating unit 13, a screening unit 14, a first web forming unit 15, a fragmenting unit 16, a mixing unit 17, a fiber piling-up unit 18, a second web forming unit 19, a sheet shaping unit 20, a cutting unit 21, a stock unit 22, and a collection unit 27.

The sheet manufacturing apparatus 100 further includes humidifying units 231, 232, 233, 234, 235, and 236 provided for the purpose of humidifying the raw material and humidifying the space in which the raw material moves.

In the present embodiment, the humidifying units 231, 232, 233, and 234 are configured as vaporizing humidifiers or warm-air-vaporization-type humidifiers. That is, the humidifying unit 231, 232, 233, 234 includes a moistened filter that is not illustrated, and supplies humidified air by passing air through the filter. The humidifying unit 231, 232, 233, 234 may include a heater (not illustrated) that increases the humidity of humidified air effectively.

In the present embodiment, the humidifying units 235 and 236 are configured as ultrasonic humidifiers. That is, the humidifying unit 235, 236 includes a vibration unit (not illustrated) that atomizes water, and supplies a mist generated by the vibration unit.

The raw material supplying unit 11 supplies a raw material M1 to the coarse crushing unit 12. The raw material used by the sheet manufacturing apparatus 100 for manufacturing sheets may be any material that contains fibers. Some examples of the raw material include: paper, pulp, pulp sheets, cloth encompassing a nonwoven fabric, a woven fabric, or the like. The present embodiment discloses an example in which the sheet manufacturing apparatus 100 is configured to use waste paper as the raw material. The raw material supplying unit 11 may include, for example, a stacker, on which sheets of waste paper are loadable in a stacked state, and an automatic material feeder, which feeds the waste paper from the stacker to the coarse crushing unit 12.

The coarse crushing unit 12 shreds (coarsely crushes) the raw material M1 supplied by the raw material supplying unit 11 into coarsely crushed pieces M2 by using a pair of coarse crushing blades 121. The coarse crushing blades 121 shred the raw material under atmospheric conditions such as in air. For example, the coarse crushing unit 12 includes the pair of coarse crushing blades 121 configured to shred the raw material, with the raw material nipped therebetween, a chute 122, and a driving unit configured to cause the coarse crushing blades 121 to rotate. The structure of the coarse crushing unit 12 may be similar to the structure of a so-called shredder. The shape and size of a coarsely crushed piece M2 may be any shape and size. It is sufficient as long as the shape and size of a coarsely crushed piece are suitable for defibration to be performed by the defibrating unit 13. For example, the coarse crushing unit 12 shreds the raw material into pieces each having a shredded size of one to a few square centimeters, or smaller.

The chute 122 is disposed under the pair of coarse crushing blades 121 and has a shape like, for example, a funnel. Having this structure, the chute 122 is capable of receiving the coarsely crushed pieces M2 shredded by, and falling from, the coarse crushing blades 121.

The humidifying unit 231 is disposed next to the pair of coarse crushing blades 121 over the chute 122. The humidifying unit 231 humidifies the coarsely crushed pieces M2 in the chute 122. Supplying humidified air to the coarsely crushed pieces M2 makes it possible to prevent the static cling of the coarsely crushed pieces M2 to the chute 122 and the like.

The chute 122 is connected to the defibrating unit 13 via a pipe 241. The coarsely crushed pieces M2 having accumulated in the chute 122 are sent to the defibrating unit 13 through the pipe 241.

The defibrating unit 13 performs defibrating processing on the coarsely crushed pieces M2 having been shredded by the coarse crushing unit 12, thereby producing a defibrated material M3. The term "defibration" means the disentanglement of the coarsely crushed pieces M2 made of plural entangled fibers into individual fibers. In addition to the defibrating function, the defibrating unit 13 has a function of separating resin particles adhering to the raw material, and other substances adhering thereto such as an ink, a toner, a blurring inhibitor, etc., from the fibers.

The output from the defibrating unit 13 is referred to as defibrated material M3. The defibrated material M3 could sometimes contain, in addition to defibrated fibers, particles of a resin separated from the fibers during the process of defibration (particles of a binder resin for bonding the fibers to one another), a colorant such an ink, a toner, etc., an additive such as a blurring inhibitor, a paper-stiffening agent, etc. The defibrated material has a string shape or a ribbon shape. The defibrated material may be in a state of not being intertwined with any other defibrated fiber (independent state) or in a state of being intertwined with other defibrated material to form a lump.

The defibrating unit 13 performs dry defibration. The term "dry" as used herein means a method in which processing such as defibration is performed under atmospheric conditions, for example, in air, not in a liquid. In the present embodiment, the defibrating unit 13 is configured using an impeller mill. Specifically, the defibrating unit 13 includes a rotor (not illustrated) that rotates at a high speed and a liner (not illustrated) that is located at the outer circumference of the rotor. The coarsely crushed pieces produced through shredding by the coarse crushing unit 12 go between the rotor and the liner and are defibrated thereat. The defibrating unit 13 generates an airflow by rotation of the rotor. Using this airflow, the defibrating unit 13 is capable of sucking the coarsely crushed pieces M2, namely, the raw material, from the pipe 241 and sending the defibrated material M3. The defibrated material M3 is sent out to a pipe 242 and is then sent to the screening unit 14 through the pipe 242.

As described above, the defibrated material M3 produced at the defibrating unit 13 is sent from the defibrating unit 13 to the screening unit 14 by the airflow generated by the defibrating unit 13. In the present embodiment, the sheet manufacturing apparatus 100 further includes a defibrating blower 261, which is an airflow generator, and the defibrated material M3 is sent to the screening unit 14 by the airflow generated by the defibrating blower 261. The defibrating blower 261 is mounted on the pipe 242, sucks air from the defibrating unit 13 together with the defibrated material M3, and sends the air together with the defibrated material M3 to the screening unit 14.

The screening unit 14 screens the defibrated material M3 according to the lengths of fibers. The defibrated material M3 is sorted into a first screened material M4-1 and a second screened material M4-2, which is larger than the first screened material M4-1, at the screening unit 14. The first screened material M4-1 has a size suitable for the subsequent manufacture of a sheet S. The average length may be preferably 1 μm or greater and 30 μm or less. The second screened material M4-2 contains, for example, insufficiently defibrated fibers, excessive agglomeration of defibrated fibers, and the like.

In the present embodiment, the screening unit 14 includes a drum portion 141 and a housing portion 142, in which the drum portion 141 is housed.

The drum portion 141 is a sieve that has a cylindrical net structure and rotates around its central axis. The defibrated material M3 flows into the drum portion 141. By rotation of the drum portion 141, the defibrated material M3 that is smaller than the mesh of the net is sorted as the first screened material M4-1, and the defibrated material M3 that is larger than the mesh of the net is sorted as the second screened material M4-2.

The first screened material M4-1 falls from the drum portion 141. On the other hand, the second screened material M4-2 is sent to a pipe 243 connected to the drum portion 141. The pipe 243 is connected to the pipe 241 at its end that is the opposite of an end connected to the drum portion 141, that is, at the upstream end. The second screened material M4-2 that has flowed through the pipe 243 merges with the coarsely crushed pieces M2 inside the pipe 241 and flows together with the coarsely crushed pieces M2 into the defibrating unit 13. By this means, the second screened material M4-2 is returned to the defibrating unit 13 and is subjected to defibration again together with the coarsely crushed pieces M2. The first screened material M4-1 falls from the drum portion 141 while being dispersed in air and travels toward the first web forming unit 15, which is located under the drum portion 141.

The first web forming unit 15 forms a first web M5 from the first screened material M4-1. The first web forming unit 15 includes a mesh belt 151, three stretching rollers 152, and a suction unit 153.

The mesh belt 151 is an endless belt, and the first screened material M4-1 accumulates thereon. The mesh belt 151 is stretched around the three stretching rollers 152. The first screened material M4-1 on the mesh belt 151 is transported downstream by the rotation of the stretching rollers 152.

The first screened material M4-1 has a size larger than the mesh of the mesh belt 151. Therefore, the first screened material M4-1 is unable to pass through the mesh belt 151 and is thus able to accumulate on the mesh belt 151. The first screened material M4-1 is transported downstream together with the mesh belt 151 while accumulating on the mesh belt 151. Therefore, the first web M5 that has a layer shape is formed.

There is a possibility that the first screened material M4-1 contains, for example, dust particles or the like. For example, coarse crushing or defibration could sometimes produce dust particles or the like. The dust particles or the like are collected into the collection unit 27 to be described later.

The suction unit 153 is a suction mechanism that sucks air from below the mesh belt 151. By this means, it is possible to suck dust particles or the like that have passed through the mesh belt 151, together with air. The suction unit 153 is connected to the collection unit 27 via a pipe 244. The dust particles or the like sucked by the suction unit 153 are collected into the collection unit 27.

A pipe 245 is connected to the collection unit 27. A blower 262 is provided on a portion located between the ends of the pipe 245. By the operation of the blower 262, a suction force can be generated in the suction unit 153. This facilitates the forming of the first web M5 on the mesh belt 151. The first web M5 formed in this way does not contain dust particles or the like. The dust particles or the like flow through the pipe 244 to reach the collection unit 27 due to the operation of the blower 262.

The housing portion 142 is connected to the humidifying unit 232. The humidifying unit 232 is a vaporizing humidifier, similarly to the humidifying unit 231. Therefore, humidified air is supplied into the housing portion 142. The humidified air humidifies the first screened material M4-1. This prevents the static cling of the first screened material M4-1 to the inner wall of the housing portion 142.

The humidifying unit 235 is disposed downstream of the screening unit 14. The humidifying unit 235 is an ultrasonic humidifier that sprays atomized water. This ultrasonic misting supplies moisture to the first web M5, thereby adjusting the moisture content of the first web M5. The moisture adjustment prevents the static cling of the first web M5 to the mesh belt 151. Therefore, the first web M5 comes off easily from the mesh belt 151 at a position where the mesh belt 151 is turned back by the stretching roller 152.

The fragmenting unit 16 is disposed downstream of the humidifying unit 235. The fragmenting unit 16 performs fragmentation of the first web M5 having come off from the mesh belt 151. The fragmenting unit 16 includes a propeller 161 that is rotatably supported and a housing portion 162 in which the propeller 161 is housed. It is possible to fragment the first web M5 by rotating the propeller 161. The first web M5 is broken into fragments M6 through this operation. The fragments M6 fall inside the housing portion 162.

The housing portion 162 is connected to the humidifying unit 233. The humidifying unit 233 is a vaporizing humidifier, similarly to the humidifying unit 231. Therefore, humidified air is supplied into the housing portion 162. The humidified air prevents the static cling of the fragments M6 to the propeller 161 or the inner wall of the housing portion 162.

The first screened material M4-1 outputted from the screening unit 14 may be supplied directly to the mixing unit 17. In that case, there is no need to provide the first web forming unit 15 and the fragmenting unit 16.

The mixing unit 17 is disposed downstream of the fragmenting unit 16. The mixing unit 17 mixes the fragments M6 with a resin P1. The mixing unit 17 includes a binder supplying portion 171, a pipe 172, and a blower 173.

The pipe 172 is a flow passage which connects the housing portion 162 of the fragmenting unit 16 and a case 3 of the fiber piling-up unit 18 and through which a mixture M7 of the fragments M6 and the resin P1 flows.

The binder supplying portion 171 is connected to a portion located between the ends of the pipe 172. The binder supplying portion 171 includes a screw feeder 174. By rotation of the screw feeder 174, it is possible to supply the resin P1 that is in the form of powder or particles into the pipe 172. The resin P1 supplied into the pipe 172 is mixed with the fragments M6 to turn into the mixture M7.

The resin P1 binds fibers to one another. For example, a thermoplastic resin, a curable resin, or the like can be used as the resin P1. It will be advantageous to use a thermoplastic resin. Examples of the thermoplastic resin include an AS resin, an ABS resin, polyethylene, polypropylene, polyolefin such as an ethylene-vinyl acetate copolymer (EVA), modified polyolefin, an acrylic resin such as polymethyl methacrylate, polyvinyl chloride, polystyrene, polyester such as polyethylene terephthalate and polybutylene terephthalate, polyamide such as nylon 6, nylon 46, nylon 66, nylon 610, nylon 612, nylon 11, nylon 12, nylon 6-12, and nylon 6-66, polyphenylene ether, polyacetal, polyether, polyphenylene oxide, polyetheretherketone, polycarbonate, polyphenylene sulfide, thermoplastic polyimide, polyetherimide, a liquid crystal polymer such as aromatic polyester, various thermoplastic elastomers such as a styrene-based thermoplastic elastomer, a polyolefin-based thermoplastic elastomer, a polyvinyl chloride-based thermoplastic elastomer, a polyurethane-based thermoplastic elastomer, a polyester-based thermoplastic elastomer, a polyamide-based thermoplastic elastomer, a polybutadiene-based thermoplastic elastomer, a trans polyisoprene-based thermoplastic elastomer, a fluoro rubber-based thermoplastic elastomer, and a chlorinated polyethylene-based thermoplastic elastomer, and the like. Any one selected from among those enumerated above, or a combination of two or more, may be used. Preferably, for example, polyester or a composition containing polyester may be used as the thermoplastic resin.

Besides the resin P1, for example, a colorant for coloring fibers, an aggregation inhibitor for inhibiting aggregation of fibers or aggregation of the resin P1, a flame retardant for making fibers difficult to burn, a paper strengthening agent for enhancing the strength of a sheet S, and the like may be included in the supply from the binder supplying portion 171. Alternatively, a composite of the resin P1 containing any of them prepared in advance may be supplied from the binder supplying portion 171. A binder made of starch may be supplied from the binder supplying portion 171 in place of the resin P1.

The blower 173 is disposed downstream of the binder supplying portion 171 on a portion located between the ends of the pipe 172. The fragments M6 and the resin P1 are mixed with each other by the action of the rotating portion such as blades of the blower 173. The blower 173 is able to generate an airflow toward the fiber piling-up unit 18. The airflow stirs the fragments M6 and the resin P1 inside the pipe 172. This makes it possible for the mixture M7 to flow into the fiber piling-up unit 18 in a state in which the fragments M6 and the resin P1 are uniformly dispersed. The fragments M6 in the mixture M7 are disentangled in the process of flowing through the pipe 172, thereby turning into a finer fibrous form.

The fiber piling-up unit 18 disentangles fibers intertwined with one another in the material containing the fibers, that is, in the mixture M7, and disperses the disentangled fibers in air. The structure of the fiber piling-up unit 18 will be described in detail later. The mixture M7 having been dispersed in air by the fiber piling-up unit 18 falls and travels toward the second web forming unit 19, which is located under the fiber piling-up unit 18.

The second web forming unit 19 is a section that performs a second web forming process of forming a second web M8 from the mixture M7. The fiber piling-up unit 18 includes a mesh belt 191, which is an example of a transportation belt, stretching rollers 192, and a suction unit 193.

The mesh belt 191 is an endless belt, and the mixture M7 accumulates thereon. The mesh belt 191 is stretched around the four stretching rollers 192. The mixture M7 on the mesh belt 191 is transported downstream by the rotation of the stretching rollers 192.

The size of most of the mixture M7 on the mesh belt 191 is larger than the mesh of the mesh belt 191. Therefore, most of the mixture M7 is unable to pass through the mesh belt 191 and is thus able to accumulate on the mesh belt 191. The mixture M7 is transported downstream together with the mesh belt 191 while accumulating on the mesh belt 191. Therefore, the second web M8 that has a layer shape is formed.

The suction unit 193 is a suction mechanism that sucks air from below the mesh belt 191. Therefore, it is possible to suck the mixture M7 onto the mesh belt 191, thereby facilitating the accumulation of the mixture M7 on the mesh belt 191.

A pipe 246 is connected to the suction unit 193. A blower 263 is provided on a portion located between the ends of the pipe 246. By the operation of the blower 263, a suction force can be generated in the suction unit 193.

The humidifying unit 236 is disposed downstream of the fiber piling-up unit 18. The humidifying unit 236 is an ultrasonic humidifier, similarly to the humidifying unit 235. This ultrasonic misting supplies moisture to the second web M8, thereby adjusting the moisture content of the second web M8. The moisture adjustment prevents the static cling of the second web M8 to the mesh belt 191. Therefore, the second web M8 comes off easily from the mesh belt 191 at a position where the mesh belt 191 is turned back by the stretching roller 192.

The sheet shaping unit 20 is disposed downstream of the second web forming unit 19. The sheet shaping unit 20 forms a sheet S from the second web M8. The sheet shaping unit 20 includes a pressing portion 201 and a heating portion 202.

The pressing portion 201 includes a pair of calendar rollers 203 and is able to press the second web M8 between the calendar rollers 203 without heating. This increases the density of the second web M8. For example, the degree of non-heated pressing may be preferably a degree that does not cause the melting of the resin P1. The second web M8 with increased density is transported to the heating portion 202. One of the pair of calendar rollers 203 is a drive roller that is driven by the operation of a motor that is not illustrated, and the other is a driven roller.

The heating portion 202 includes a pair of heating rollers 204. It is possible to apply pressure while heating the second web M8 between the heating rollers 204. The heating with pressure applied causes the melting of the resin P1 in the second web M8, and fibers are bonded together by the molten resin P1. The sheet S is formed in this way. The sheet S is transported to the cutting unit 21. One of the pair of heating rollers 204 is a drive roller that is driven by the operation of a motor that is not illustrated, and the other is a driven roller.

The cutting unit 21 is disposed downstream of the sheet shaping unit 20. The cutting unit 21 cuts the sheet S. The cutting unit 21 includes a first cutter 211 and a second cutter 212.

The first cutter 211 cuts the sheet S in a direction that intersects with the transportation direction of the sheet S, in particular, a direction that is orthogonal thereto. The second cutter 212 cuts the sheet S in a direction parallel to the transportation direction of the sheet S downstream of the first cutter 211. This cutting is to remove unnecessary edge portions at both ends of the sheet S, that is, the ends in the +Y direction and the −Y direction, to adjust the width of the sheet S. The cut and removed portion is called "waste edge".

A sheet S having a desired shape and size can be obtained by cutting with the first cutter 211 and the second cutter 212 described above. The sheet S is further transported downstream and is then ejected onto the stock unit 22.

Each of the components of the sheet manufacturing apparatus 100 described above is electrically coupled to a control unit that is not illustrated. The operation of each of these components is controlled by the control unit.

Next, with reference to FIGS. 2 to 4, a structure of the fiber piling-up unit 18 will now be described.

Figure 2:
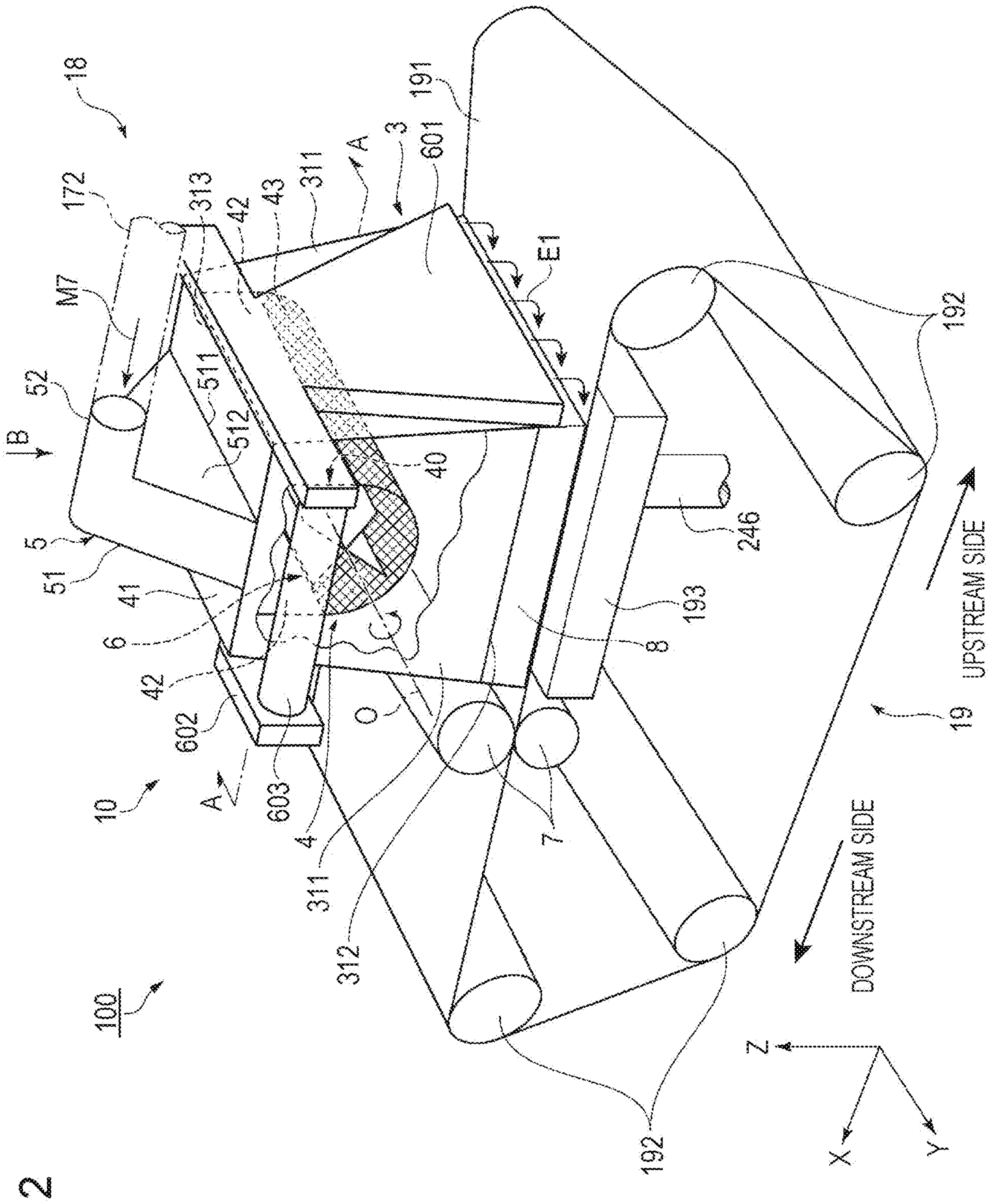
FIG. 2 is a perspective view illustrating a structure of a fiber piling-up unit.
Figure 3:
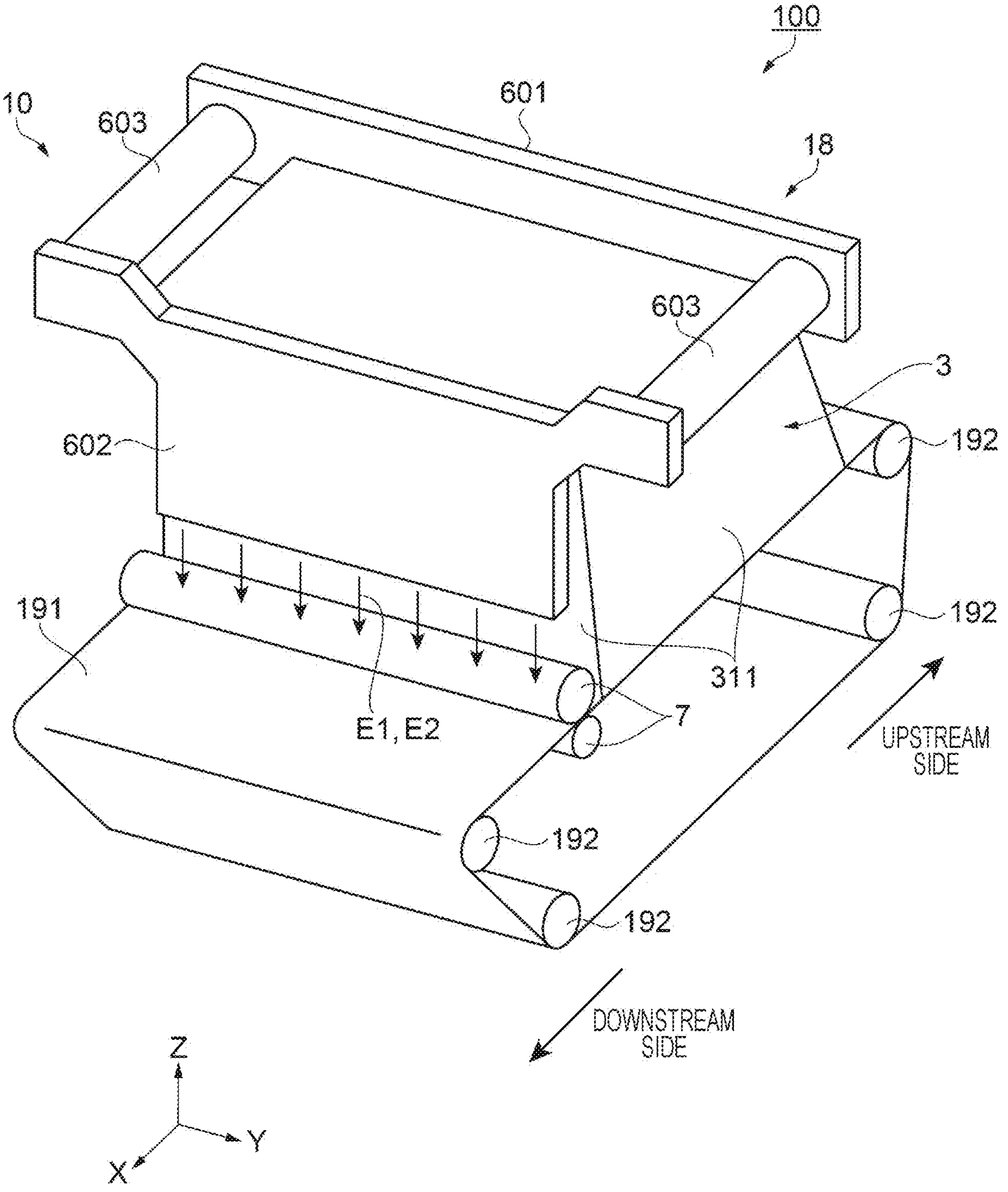
FIG. 3 is a perspective view illustrating a structure of a fiber piling-up unit.
Figure 4:
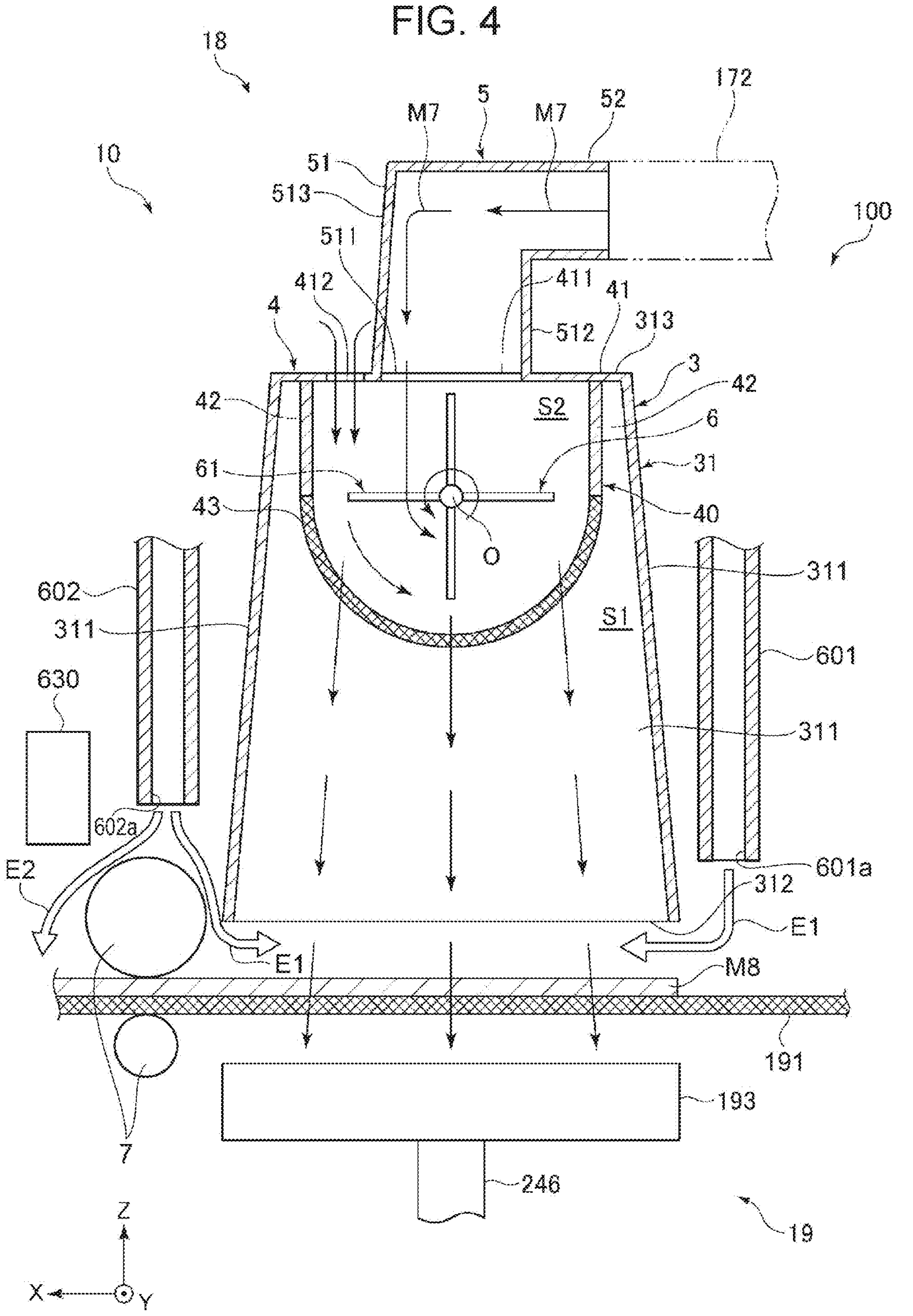
FIG. 4 is a cross-sectional view illustrating a structure of the fiber piling-up unit.

As illustrated in FIGS. 2 to 4, the fiber piling-up unit 18 includes a case 3, a containing portion 4 located inside the case 3 and configured to disperse the mixture M7 contained therein, and a supplying portion 5 configured to supply the mixture M7 to the containing portion 4, and a rotating portion 6 provided inside the containing portion 4.

The case 3 includes a hollow housing body 31. The housing body 31 includes four sidewalls 311. The housing body 31 embraces the containing portion 4 in a space S1 surrounded by these sidewalls 311 and serves as an enclosure between the containing portion 4 and the mesh belt 191.

The housing body 31 further includes a lower opening 312, which faces the mesh belt 191, and an upper opening 313, which is located at the opposite side. The lower opening 312 is an exit opening through which the mixture M7 dispersed from the containing portion 4 goes out. The upper opening 313 is covered by a top plate 41 of the containing portion 4.

A pair of seal rollers 7 that holds the second web M8 in place is provided downstream of the lower opening 312. The seal rollers 7 are disposed with the mesh belt 191 interposed therebetween. A seal member 8 that provides sealing between the mesh belt 191 and the housing body 31 is provided at, of the edges of the lower opening 312, the portion where the seal rollers 7 are not provided. The seal rollers 7 and the seal member 8 enable air to flow in through communication inlets 412 as will be described later without impairing the suction power of the suction unit 193. Moreover, since slight pressure is applied to the second web M8 by the seal rollers 7, it is possible to prevent the second web M8 from being disarranged.

As described above, the fiber piling-up unit 18 includes the case 3 covering the space S1, which is a portion between the containing portion 4 and the mesh belt 191, and including the lower opening 312 provided at a position where it faces the mesh belt 191. With this structure, it is possible to effectively produce a flow of air going down in the space S1 by using a suction force of the suction unit 193. Therefore, it is possible to facilitate the accumulation of the mixture M7 dispersed from the containing portion 4 onto the mesh belt 191.

The mesh belt 191 transports the second web M8 in a transportation direction that is along the X direction. An upstream-side nozzle 601, which is an example of a nozzle, is disposed upstream of the case 3 in the transportation direction. A downstream-side nozzle 602 is disposed downstream of the case 3 in the transportation direction. The humidifying units 234 are connected to the upstream-side nozzle 601 and the downstream-side nozzle 602 (see FIG. 1).

The containing portion 4 includes the top plate 41 closing the upper opening 313 of the case 3, a pair of sidewalls 42 provided under the top plate 41, and a porous screen 43 including a plurality of pores.

The top plate 41 includes a supply opening 411 provided as a through hole in its thickness direction and the plurality of communication inlets 412 provided as through holes in its thickness direction. The supply opening 411 is a portion which is in communication with the supplying portion 5 and through which the mixture M7 passes. The supply opening 411 has an elongated shape the longer side of which extends in the Y direction, and is provided at substantially the center in the X direction of the top plate 41. The pair of sidewalls 42 each have an elongated shape the longer side of which extends in the Y direction, and are provided on the lower surface of the top plate 41 in such a way as to face each other, with the supply opening 411 located therebetween.

The porous screen 43 has a semi-cylindrical shape extending in the Y direction and bulged in the −Z direction. That is, the porous screen 43 has an arch shape at every position in the Y direction when viewed in cross section the line normal to which is the Y axis. This shape allows the mixture M7 to move smoothly in the containing portion 4 and makes it possible to stir the mixture M7 well. The porous screen 43 is connected to each of the sidewalls 42. The space that is demarcated by the porous screen 43, the pair of sidewalls 42, and the top plate 41 serves as a container space S2 containing the mixture M7.

In the containing portion 4, the +Y-axis side and the −Y-axis side of the container space S2 are closed by walls that are not illustrated. The walls support the rotating portion 6 to be described later rotatably.

The porous screen 43 may be, for example, a net member, or a plate member having many through holes. Because of this structure, the mixture M7 contained in the containing portion 4 is dispersed out of the container space S2 through the porous screen 43. Moreover, setting the mesh size or through-hole size of the porous screen 43 appropriately makes it possible to preferentially disperse the mixture M7 having desired fiber lengths and preferentially causing the mixture M7 having desired fiber lengths to pile up on the mesh belt 191.

In the containing portion 4 described above, the top plate 41 and the sidewalls 42 serve as a holder portion 40 that holds the porous screen 43. Since the communication inlets 412 are provided in the holder portion 40, it is possible to take air into the containing portion 4 directly, not via the porous screen 43.

The supplying portion 5 is a port provided over the top plate 41. The supplying portion 5 includes a port body 51, and a joint portion 52 provided on the port body 51.

The port body 51 has a box-like shape with a quadrangular opening 511 at its bottom. The opening 511 has a shape like a rectangle the size of which is large enough to encompass the supply opening 411 of the top plate 41. The port body 51 is provided over the top plate 41 in such a way as to be in communication with the supply opening 411 of the top plate 41 through the opening 511. Because of this communication, it is possible to supply the mixture M7 into the containing portion 4 by means of the supplying portion 5.

As illustrated in FIG. 2, the port body 51 has a substantially triangular shape when viewed in the X direction. Therefore, the port body 51 widens as it goes down (in the −Z direction) when viewed in cross section the line normal to which is the Z axis. That is, the area of the inner cavity of the port body 51 increases gradually toward the containing portion 4.

The joint portion 52 is provided at a top portion of a −X-axis-side sidewall 512 of the port body 51. The joint portion 52 is a portion protruding cylindrically in the −X direction. The pipe 172, through which the mixture M7 flows, is connected to the joint portion 52.

First, the mixture M7 having flowed through the pipe 172 flows into the port body 51 through the joint portion 52. The mixture M7 having entered the port body 51 either collides with a sidewall 513 facing the sidewall 512 or is borne by air to the neighborhood thereof. In this process, the mixture M7 goes down while being disentangled to some extent. For this reason, even if there is any lump in the mixture M7, it is possible to prevent the mixture M7 from being supplied in such an as-is state into the containing portion 4. The mixture M7 is supplied into the containing portion 4 through the opening 511 and the supply opening 411.

Moreover, since the mixture M7 flows down along the sidewall 513 as described above when flowing into the containing portion 4, the mixture M7 flows in at the +X-axis side with respect to a rotation axis O inside the containing portion 4 as illustrated in FIG. 4. As will be described later, the rotating portion 6 is configured to rotate counterclockwise as viewed from the +Y-axis side; therefore, the mixture M7 having flowed into the containing portion 4 goes with the flow of air along the direction of rotation of the rotating portion 6 without going against it. That is, the supplying portion 5 supplies the mixture M7, which is the material, along the direction of rotation of the rotating portion 6. This reduces the possibilities of the stagnation of the mixture M7 inside the containing portion 4 or the backflow of the mixture M7 toward the supplying portion 5 and makes it possible to disentangle the mixture M7 inside the containing portion 4.

The rotating portion 6 has a function of rotating inside the containing portion 4 and thereby facilitating dispersion from the porous screen 43 while stirring and disentangling the mixture M7 having been supplied into the containing portion 4. The rotating portion 6 includes four blades 61. The blade 61 is made of an elongated material the longer side of which extends in the Y direction. The blades 61 are coupled to one another at one longer-side end thereof, and rotate with the coupled portion acting as the center of rotation, that is, as the rotation axis O. In the present embodiment, the rotating portion 6 has a shape of a cross in cross section the line normal to which is the rotation axis O. That is, the blades 61 are coupled at equal intervals in the direction of rotation.

The rotating portion 6 is coupled to a rotation driver that is not illustrated. The operation of the rotation driver is controlled by a control unit. In the present embodiment, the rotating portion 6 rotates counterclockwise as viewed from the +Y-axis side.

By the rotation of the rotating portion 6, each of the blades 61 stirs and disentangles the mixture M7 contained in the containing portion 4 and pushes an appropriate amount of it against the porous screen 43 while stirring and disentangling it. This makes it possible to prevent the clogging of the porous screen 43 with the mixture M7 and, in addition, to disperse the mixture M7 uniformly through the entire area of the porous screen 43.

Moreover, the rotating portion 6 rotates with each of the blades 61 spaced apart from the sidewalls 42 and the porous screen 43. This makes it possible to prevent excessive pressure from being applied to the mixture M7 between the blades 61 and the porous screen 43 and thus to perform good dispersion.

As illustrated in FIGS. 2 to 4, in the sheet manufacturing apparatus 100, the upstream-side nozzle 601, which is one of the components of a humidifying mechanism 10, is disposed upstream of the case 3 in the transportation direction. The downstream-side nozzle 602, which is one of the components of a humidifying mechanism 10, is disposed downstream of the case 3 in the transportation direction. The humidifying mechanism 10 supplies humidified air to the fiber piling-up unit 18.

Specifically, the upstream-side nozzle 601 is disposed adjacent to the upstream-side sidewall 311 in the transportation direction with respect to the case 3. The downstream-side nozzle 602 is disposed adjacent to the downstream-side sidewall 311 in the transportation direction with respect to the case 3.

Since the nozzles 601 and 602 are disposed adjacent to the sidewalls 311 as described above, it is possible to supply most of humidified air E1 toward the second web M8 and thus to humidify the second web M8 and the fibers.

As illustrated in FIGS. 2 and 3, the inside of the upstream-side nozzle 601 is continuous to the inside of the downstream-side nozzle 602 through pipes 603. The upstream-side nozzle 601 and the downstream-side nozzle 602 are each connected to, for example, a vaporizing humidifier 234, which is one of the components of the humidifying mechanism 10 (see FIG. 1). That is, the humidified air E1 is supplied to each of the upstream-side nozzle 601 and the downstream-side nozzle 602 by means of the humidifying unit 234.

The upstream-side nozzle 601 includes an opening portion 601*a* through which the humidified air E1 is supplied. Similarly, the downstream-side nozzle 602 includes an opening portion 602*a* through which the humidified air E1 is supplied. As illustrated in FIG. 4 and as described earlier, the suction unit 193 is disposed under the fiber piling-up unit 18. Therefore, the humidified air E1 supplied from the nozzles 601 and 602 is sucked by the suction unit 193, thereby being supplied to the fiber piling-up unit 18, and to the gap space between the fiber piling-up unit 18 and the mesh belt 191, that is, to the second web M8.

It is possible to humidify the second web M8 by using the humidified air E1. Moreover, it is possible to suppress the static cling of the mixture M7 dispersed inside the fiber piling-up unit 18 to the inner walls by using the humidified air E1.

The opening portion 601*a* of the upstream-side nozzle 601 is disposed adjacent to the lower end of the sidewall 311 in such a way as to face the mesh belt 191. Since the opening portion 601*a* of the upstream-side nozzle 601 is disposed in this way, it is possible to supply the humidified air E1 to the second web M8 on the mesh belt 191 directly and thus to suppress the drying of the second web M8.

As described above, the pair of seal rollers 7 that holds the second web M8 in place is disposed downstream of the sidewall 311 in the transportation direction in such a way as to be located adjacent to the sidewall 311. The opening portion 602*a* of the downstream-side nozzle 602 is disposed in such a way as to face the pair of seal rollers 7.

Since the opening portion 602*a* of the downstream-side nozzle 602 is disposed in such a way as to face the pair of seal rollers 7 as described here, it is possible to supply the humidified air E1 to the seal roller 7 directly and thus to suppress the electrification of the seal roller 7.

As illustrated in FIG. 4, an optical sensor 630 is disposed above the seal rollers 7 downstream of the downstream-side nozzle 602 in the transportation direction. The optical sensor 630 measures the thickness of the second web M8.

The humidified air E1 supplied from the downstream-side nozzle 602 splits into a stream of humidified air E1 that hits the seal roller 7 and flows toward the fiber piling-up unit 18, that is, toward the suction unit 193, and a stream of humidified air E2 that hits the seal roller 7 and flows toward the downstream side. Therefore, it is possible to cause the humidified air E2 to function as an air curtain and thus to suppress the cling of fibers dispersed toward the optical sensor 630. This makes it possible to keep the measurement accuracy of the optical sensor 630 high.

As described above, the upstream-side nozzle 601 is disposed upstream of the fiber piling-up unit 18, and the downstream-side nozzle 602 is disposed downstream of the fiber piling-up unit 18; therefore, it is possible to supply the humidified air E1 to the second web M8 and the fiber piling-up unit 18 and thus to suppress the electrification of fibers. Moreover, supplying the humidified air E1 from the nozzles 601 and 602 to the second web M8 makes it possible to make an amount of water used smaller than in a case where the entire periphery of the fiber piling-up unit 18 is humidified. That is, it is possible to achieve higher humidification efficiency. Furthermore, since the humidified air E1 is supplied from the nozzles 601 and 602 to the second web M8, it is possible to send the humidified air E1 to the second web M8 uniformly and thus to humidify fibers uniformly.

Next, with reference to FIGS. 5A and 5B, the structure of the upstream-side nozzle 601 will now be described.

Figure 5A:
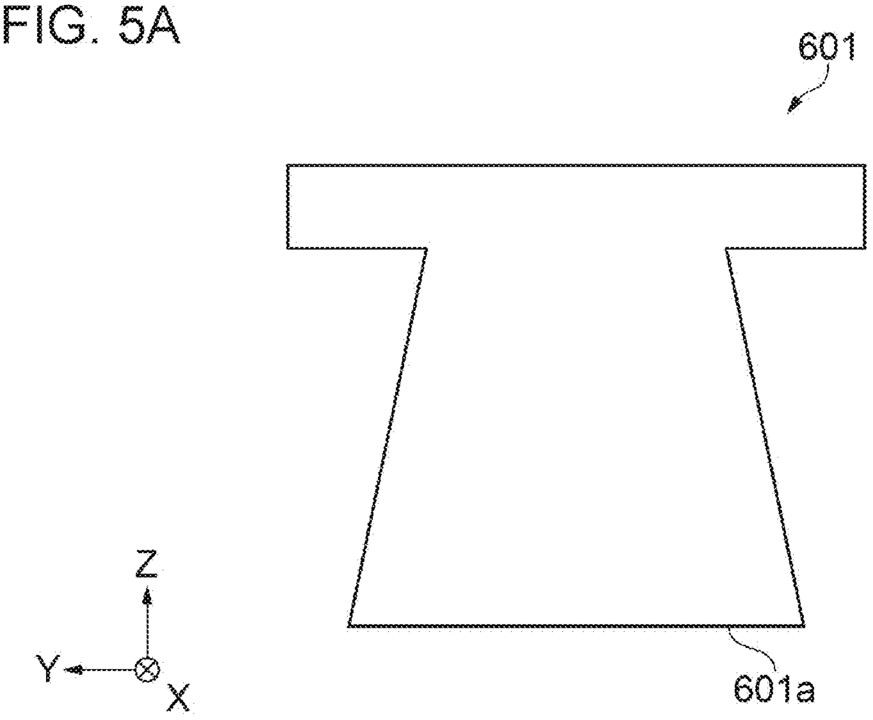
FIG. 5A is a plan view illustrating a structure of an upstream-side nozzle.

As illustrated in FIG. 5A, the upstream-side nozzle 601 has a flared shape the width of which increases gradually from the top toward the bottom as viewed from the upstream side in the transportation direction. The opening portion 601*a* is provided at the bottom of the upstream-side nozzle 601. The length W2 of the bottom of the upstream-side nozzle 601, that is, the opening portion 601*a*, is approximately equal to the width of the mesh belt 191.

Figure 5B:
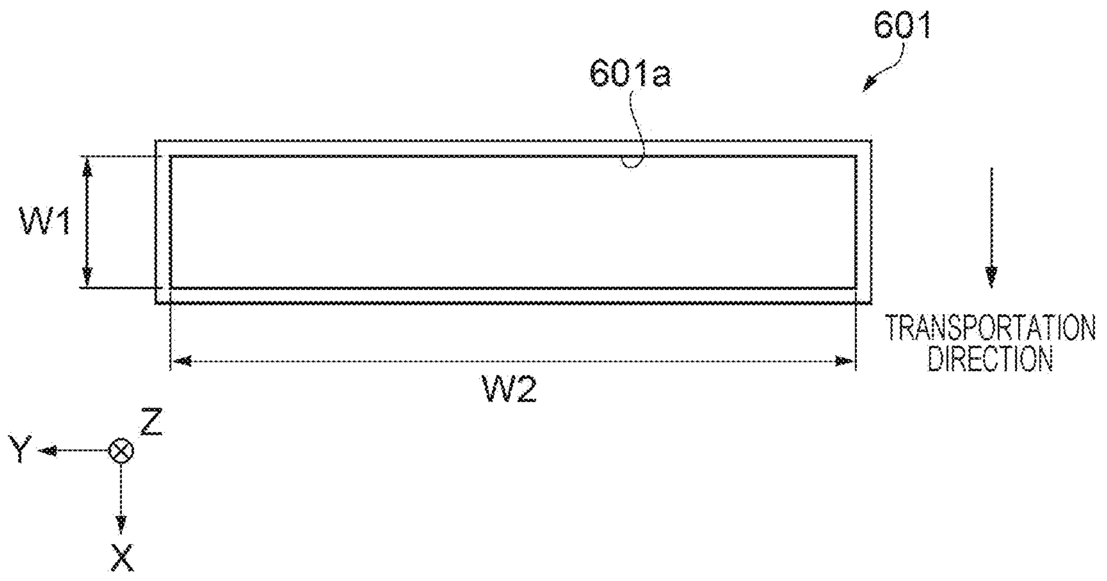
FIG. 5B is a plan view illustrating a structure of an opening portion of the upstream-side nozzle.

As illustrated in FIG. 5B, the upstream-side nozzle 601 includes the opening portion 601*a* having a rectangular shape as viewed from below, that is, as viewed from the side where the mesh belt 191 is disposed. The length W2 of the opening portion 601*a* in the direction intersecting with the transportation direction is greater than the length W1 thereof in the transportation direction. Namely, the following inequality holds: the length W1 in the transportation direction<the length W2 in the direction intersecting with the transportation direction.

Since the length W2 in the direction intersecting with the transportation direction is greater as described above, it is possible to cover the entirety of the mesh belt 191 in the width direction with the upstream-side nozzle 601, that is, cover the entire width of the second web M8 therewith, and thus to supply humidified air to the entirety of the second web M8.

Next, with reference to FIGS. 6A and 6B, the structure of the downstream-side nozzle 602 will now be described.

Figure 6A:
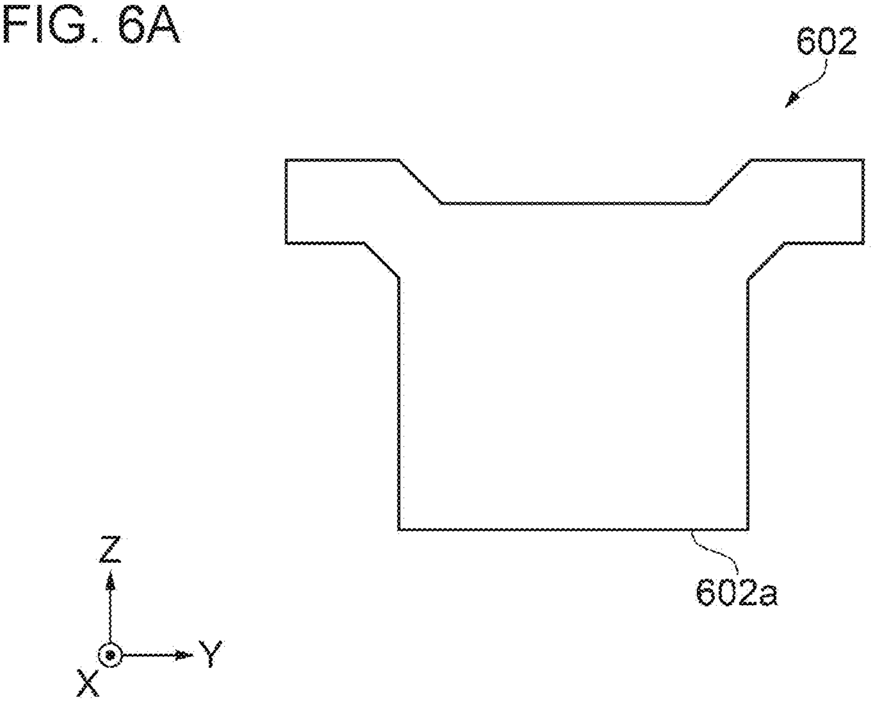
FIG. 6A is a plan view illustrating a structure of a downstream-side nozzle.

As illustrated in FIG. 6A, the downstream-side nozzle 602 has a substantially polygonal shape as viewed from the downstream side in the transportation direction. The opening portion 602*a* is provided at the bottom of the downstream-side nozzle 602. The length W12 of the bottom of the downstream-side nozzle 602, that is, the opening portion 602*a*, is approximately equal to the width of the mesh belt 191.

Figure 6B:
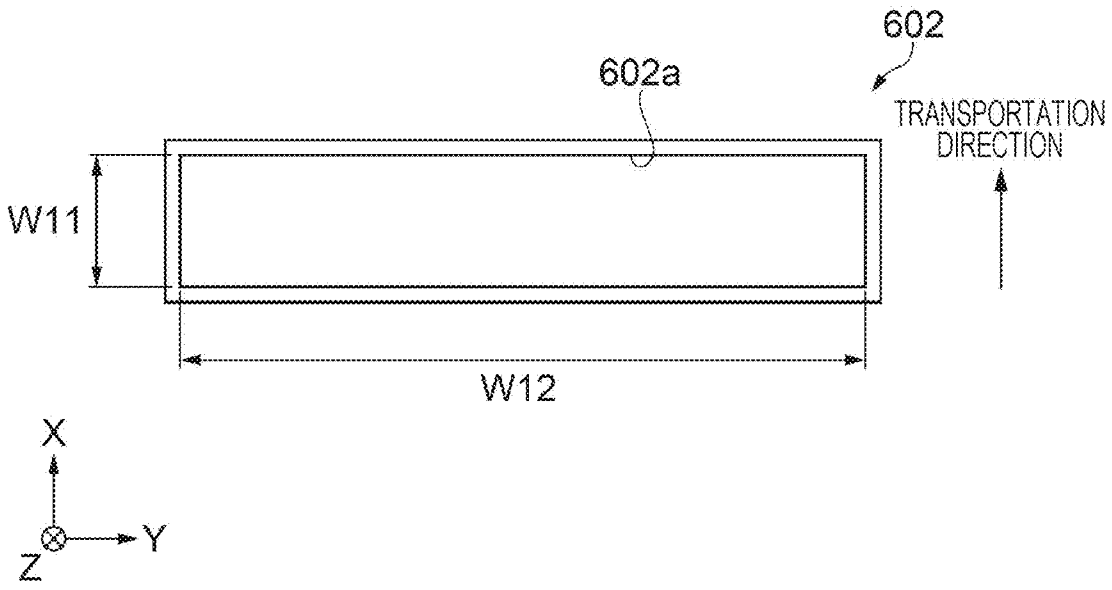
FIG. 6B is a plan view illustrating a structure of an opening portion of the downstream-side nozzle.

As illustrated in FIG. 6B, the downstream-side nozzle 602 includes the opening portion 602*a* having a rectangular shape as viewed from below, that is, as viewed from the side where the mesh belt 191 is disposed. The length W12 of the opening portion 602*a* in the direction intersecting with the transportation direction is greater than the length W11 thereof in the transportation direction. Namely, the following inequality holds: the length W11 in the transportation direction<the length W12 in the direction intersecting with the transportation direction.

Since the length W12 in the direction intersecting with the transportation direction is greater as described above, it is possible to cover the entirety of the mesh belt 191 in the width direction with the downstream-side nozzle 602, that is, cover the entire width of the second web M8 therewith, and thus to supply the humidified air E1 to the entirety of the second web M8.

As described above, the sheet manufacturing apparatus 100 according to the present embodiment includes: the defibrating unit 13 that defibrates a material to turn the material into fibers; the fiber piling-up unit 18 that piles up the fibers to form the second web M8; the pressing portion 201 that presses the second web M8 to turn the second web M8 into the sheet S; and the humidifying mechanism 10 that supplies the humidified air E1 to the fiber piling-up unit 18, wherein the fiber piling-up unit 18 includes the rotating portion 6 that stirs the fibers supplied from the defibrating unit 13, the case 3 in which the rotating portion 6 is housed, and the mesh belt 191 that is provided under the case 3 and transports the second web M8 in a transportation direction, the second web M8 is formed on the mesh belt 191 by piling up the fibers on the mesh belt 191, and the humidifying mechanism 10 includes the upstream-side nozzle 601 that is provided upstream of the fiber piling-up unit 18 in the transportation direction and supplies the humidified air E1 to the fiber piling-up unit 18.

With this structure, since the upstream-side nozzle 601 is disposed upstream of the fiber piling-up unit 18, it is possible to supply the humidified air E1 to the second web M8 and the fiber piling-up unit 18 and thus to suppress the electrification of fibers. Moreover, supplying the humidified air E1 from the upstream-side nozzle 601 to the gap space between the fiber piling-up unit 18 and the mesh belt 191 makes it possible to make an amount of water used smaller than in a case where the entire periphery of the fiber piling-up unit 18 is humidified. That is, it is possible to achieve higher humidification efficiency. Furthermore, since the humidified air E1 is supplied from the upstream-side nozzle 601, it is possible to send the humidified air E1 to the second web M8 uniformly and thus to humidify fibers uniformly.

Another advantage is as follows. For example, if the upstream-side nozzle 601 is not provided, there is a possibility that fibers in the fiber piling-up unit 18 might dry due to the entry of dry external air via the gap space between the fiber piling-up unit 18 and the mesh belt 191. In this respect, in the present embodiment, since the upstream-side nozzle 601 that supplies the humidified air E1 is disposed near the entrance to the gap space between the fiber piling-up unit 18 and the mesh belt 191, it is possible to suppress the drying of the inner space of the fiber piling-up unit 18.

In the sheet manufacturing apparatus 100 according to the present embodiment, the upstream-side nozzle 601 may be preferably disposed adjacent to the sidewall 311 of the case 3 upstream of the case 3 in the transportation direction. With this structure, since the upstream-side nozzle 601 is disposed adjacent to the sidewall 311 of the case 3, it is possible to supply most of the humidified air E1 toward the second web M8 and the fiber piling-up unit 18 and thus to humidify the second web M8 and the fibers.

In the sheet manufacturing apparatus 100 according to the present embodiment, the upstream-side nozzle 601 may preferably include the opening portion 601*a* having a rectangular shape, and the opening portion 601*a* may preferably satisfy a relation of the length W1 in the transportation direction<the length W2 in a direction intersecting with the transportation direction. According to this structure, the length in the direction intersecting with the transportation direction is greater, or in other words, it is possible to cover the entirety of the second web M8 in the width direction with the upstream-side nozzle 601 and thus to supply the humidified air E1 to the entirety of the second web M8.

In the sheet manufacturing apparatus 100 according to the present embodiment, the opening portion 601*a* may be preferably disposed adjacent to the lower end of the case 3 in such a way as to face the mesh belt 191. According to this structure, the opening portion 601*a* faces the mesh belt 191, meaning that the humidified air E1 is supplied from a position that is near the mesh belt 191; therefore, it is possible to supply the humidified air E1 to the second web M8 on the mesh belt 191 without fail and thus to suppress the drying of the second web M8.

The following is a variation example of the embodiment described above.

Figure 7:
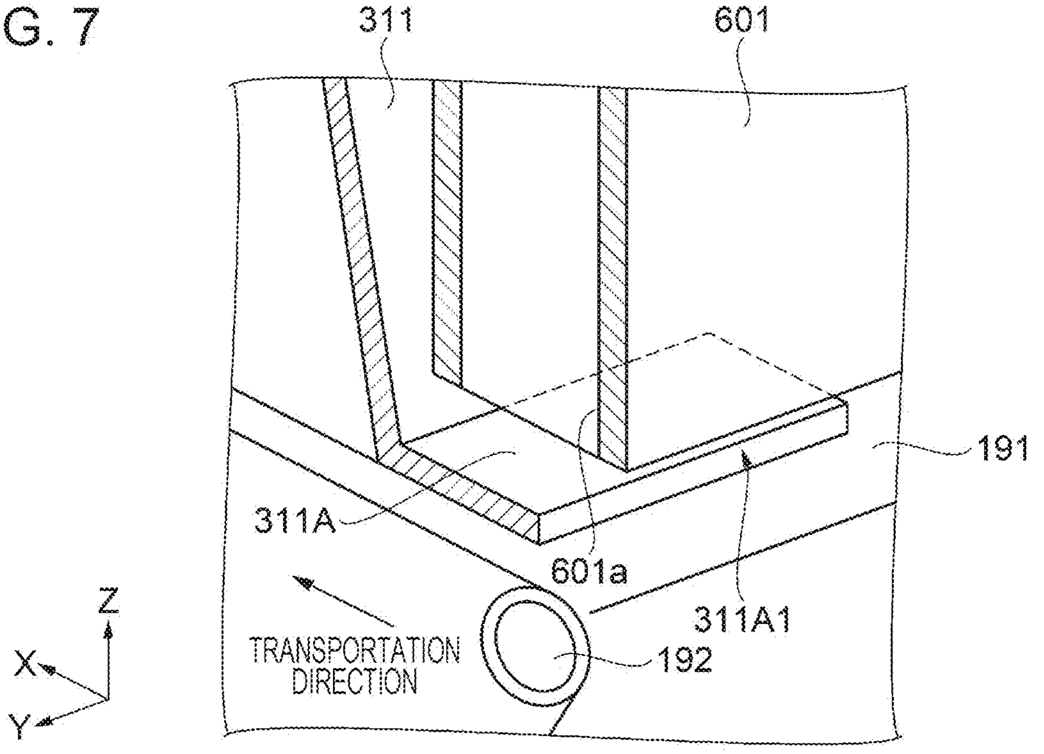
FIG. 7 is a perspective view illustrating an upstream-side structure of a housing.
Figure 8:
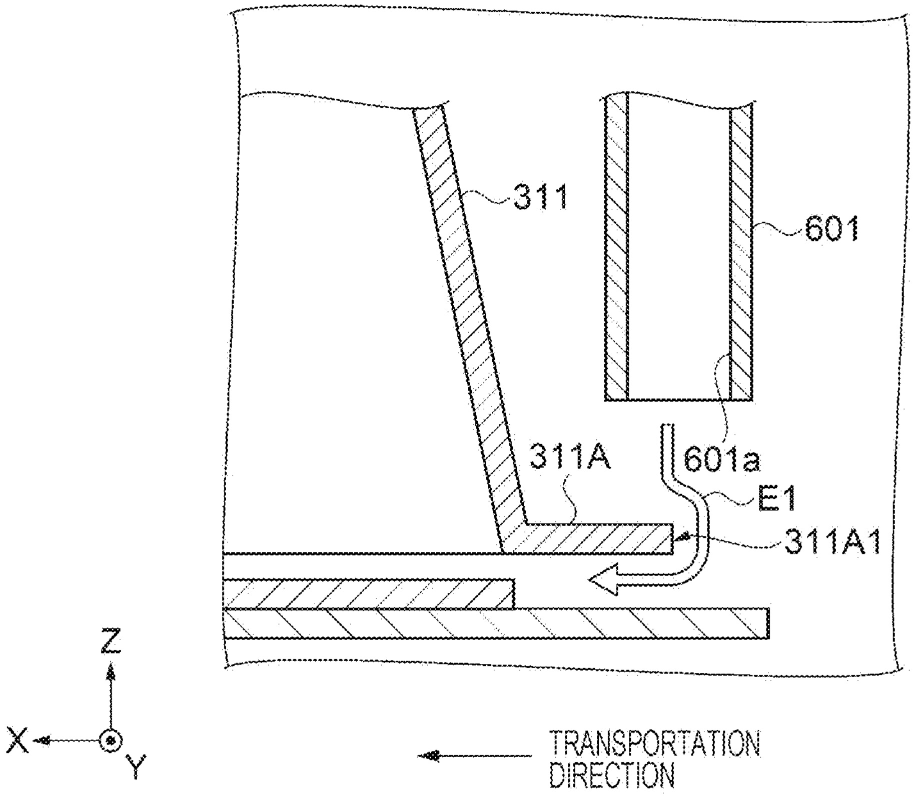
FIG. 8 is a cross-section view illustrating the upstream-side structure of the housing.

Among the sidewalls 311 that constitute the case 3 as described above, the upstream-side sidewall 311 may have a shape illustrated in FIGS. 7 and 8. FIG. 7 is a perspective view illustrating the structure of the lower end of the case 3 at the upstream side. FIG. 8 is a cross-sectional view illustrating the structure of the lower end of the case 3 at the upstream side.

As illustrated in FIGS. 7 and 8, a canopy 311A is provided at the lower end of, among the sidewalls 311 that constitute the case 3, the upstream-side sidewall 311 in such a way as to face the opening portion 601*a* of the upstream-side nozzle 601. An end portion 311A1 of the canopy 311A has a length forming an overlap with a part of the upstream-side nozzle 601 disposed adjacent to the upstream-side sidewall 311. The length of the canopy 311A in the direction intersecting with the transportation direction is approximately equal to the length W2 of the upstream-side nozzle 601.

Since the canopy 311A is provided in such a way as to face the opening portion 601*a* of the upstream-side nozzle 601 as described above, the humidified air E1 blown from the opening portion 601*a* can be supplied indirectly toward the second web M8 after hitting the canopy 311A, and this makes it possible to make the supply of the humidified air E1 to the second web M8 more uniform than in a case where the humidified air E1 is supplied from the opening portion 601*a* to the second web M8 directly without being weakened. Moreover, it is possible to prevent the second web M8 having accumulated on the mesh belt 191 from being turned up and suppress the forming of wind ripples on the second web M8.

In the sheet manufacturing apparatus 100 according to the present embodiment, a canopy 311A may be preferably provided at the lower end of the case 3 in such a way as to face the opening portion 601*a* of the upstream-side nozzle 601. According to this structure, since the canopy 311A is provided at the lower end of the case 3 in such a way as to face the opening portion 601*a*, the humidified air E1 supplied from the opening portion 601*a* can be supplied indirectly to the second web M8 after hitting the canopy 311A, and this makes it possible to make the supply of the humidified air E1 to the second web M8 more uniform than in a case where, for example, the humidified air E1 is supplied from the opening portion 601*a* to the second web M8 directly without being weakened.

What is claimed is:

1. A sheet manufacturing apparatus comprising:

a defibrating unit that defibrates a material to turn the material into fibers;

a fiber piling-up unit that piles up the fibers to form a web;

a pressing unit that presses the web to turn the web into a sheet; and a humidifying mechanism that supplies humidified air to the fiber piling-up unit, wherein the fiber piling-up unit includes a rotating portion that stirs the fibers supplied from the defibrating unit, a case in which the rotating portion is housed, and a transportation belt that is provided under the case and transports the web in a transportation direction, the web is formed on the transportation belt by piling up the fibers on the transportation belt, and the humidifying mechanism includes a nozzle that is provided upstream of the fiber piling-up unit in the transportation direction and supplies the humidified air to the fiber piling-up unit, the nozzle is disposed adjacent to a sidewall of the case upstream of the case in the transportation direction, the nozzle includes an opening portion having a rectangular shape, and a length of the opening portion in the transportation direction is less than a length of the opening portion in a direction intersecting with the transportation direction.

2. The sheet manufacturing apparatus according to claim 1, wherein the opening portion is disposed adjacent to a lower end of the case in such a way as to face the transportation belt.

3. The sheet manufacturing apparatus according to claim 1, wherein a canopy is provided at a lower end of the case in such a way as to face the opening portion of the nozzle.

* * * * *